United States Patent [19]

Vonalt et al.

[11] Patent Number: 5,052,432
[45] Date of Patent: Oct. 1, 1991

[54] UNIVERSAL SWIVEL BODY FOR A FLUID HANDLING HOSE CONNECTOR

[75] Inventors: Kerry G. Vonalt, Edgerton; William R. Tate; Ernest K. Gentit, both of Bryan, all of Ohio

[73] Assignee: The ARO Corporation, Bryan, Ohio

[21] Appl. No.: 576,374

[22] Filed: Aug. 30, 1990

[51] Int. Cl.$^5$ .......................................... B65H 75/34
[52] U.S. Cl. ............................ 137/355.16; 285/190; 285/279; 285/281; 285/375
[58] Field of Search ............... 285/190, 281, 267, 375, 285/279; 137/614, 614.04, 355.16

[56] References Cited

U.S. PATENT DOCUMENTS

| | | | |
|---|---|---|---|
| 3,210,099 | 9/1965 | Franck | 285/190 |
| 3,402,253 | 9/1965 | McCracken | 285/190 X |
| 3,999,781 | 12/1976 | Todd | 285/281 X |
| 4,006,924 | 2/1977 | Spencer | 285/279 X |
| 4,296,952 | 10/1981 | McCracken | 285/375 X |
| 4,501,442 | 2/1985 | Partus | 285/190 |
| 4,672,998 | 6/1987 | Kozak, III | 285/190 X |

Primary Examiner—Martin P. Schwadron
Assistant Examiner—Kevin Lee
Attorney, Agent, or Firm—Robert F. Palermo

[57] ABSTRACT

A universal swivel body for a fluid handling hose connector has threaded inlet and outlet ends connected by an axial fluid passageway and capable of attachment to a stationary fluid supply line and a rotating fluid service line. The axial fluid passageway has a number of internal circumferential sealing surfaces, each of which is sized and located to provide a fluid tight seal in cooperation with a compliant seal ring and with a corresponding sealing surface on a swivel adapter designed for a particular working pressure. The outlet end of the swivel adapter is capable of rotation with respect to the swivel body so that the device can be used with a hose reel.

14 Claims, 3 Drawing Sheets

UNIVERSAL SWIVEL BODY FOR A FLUID HANDLING HOSE CONNECTOR

BACKGROUND OF THE INVENTION

This invention relates generally to fluid handling systems and more particularly to systems for dispensing fluid through hoses.

In manufacturing and maintenance operations, it is often necessary to employ fluids. These may be coolants, solvents, lubricants, adhesives, or working fluids for fluid powered operations. Such dispensing may be accomplished from individual portion controlled containers of each fluid, but in most large scale operations, it is advantageous to dispense from a bulk supply of fluid.

Depending upon the viscosity of the fluid, the distance over which it must be conveyed, and the application, a wide range of dispensing pressures may be required—from less than 50 psi to approximately 5,000 psi.

Dispensing from centralized bulk supplies requires piping of the fluids to the vicinities of work stations. At the work stations, hoses are commonly used between the fixed piping outlets and the product being treated. Frequently, these hoses are quite long—as much as 50 feet, or more, and are supported on reels in order to prevent damage to the hoses.

Reels are commonly equipped with swivel connectors for the hoses to permit uncoiling and recoiling of the hose without twisting and damage. The swivel connector for each reel must be selected according to the working pressure experienced at that work station for the particular fluid being dispensed. This results in several different swivel bodies being used, often with a common reel. Because of important functional differences between swivel bodies designed for use at differing working pressures; it has been necessary to stock a large assortment of manufacturing and repair parts. Moreover, since each swivel connector requires its own reel mounted swivel body member, depending upon the intended working pressure, the swivel body member cannot be attached to the reel until the service application is determined.

The foregoing illustrates limitations known to exist in present swivel bodies for fluid handling systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a universal swivel body for a fluid handling hose connector, comprising an elongate substantially cylindrical body having threaded inlet and outlet ends for attachment to a nonrotatable fluid supply line and a rotatable fluid service hose, respectively, a central axial fluid passageway formed in the swivel body and connecting the inlet and outlet ends and provisions within the axial fluid passageway for forming a fluid tight seal with any one of a plurality of interchangeable swivel adapters, each swivel adapter being constructed for service in a different working pressure range from each other swivel adapter.

The foregoing and other aspects will become apparent from the following detailed description of the invention when considered in conjunction with the accompanying drawing figures.

DETAILED DESCRIPTION

Figure 1:
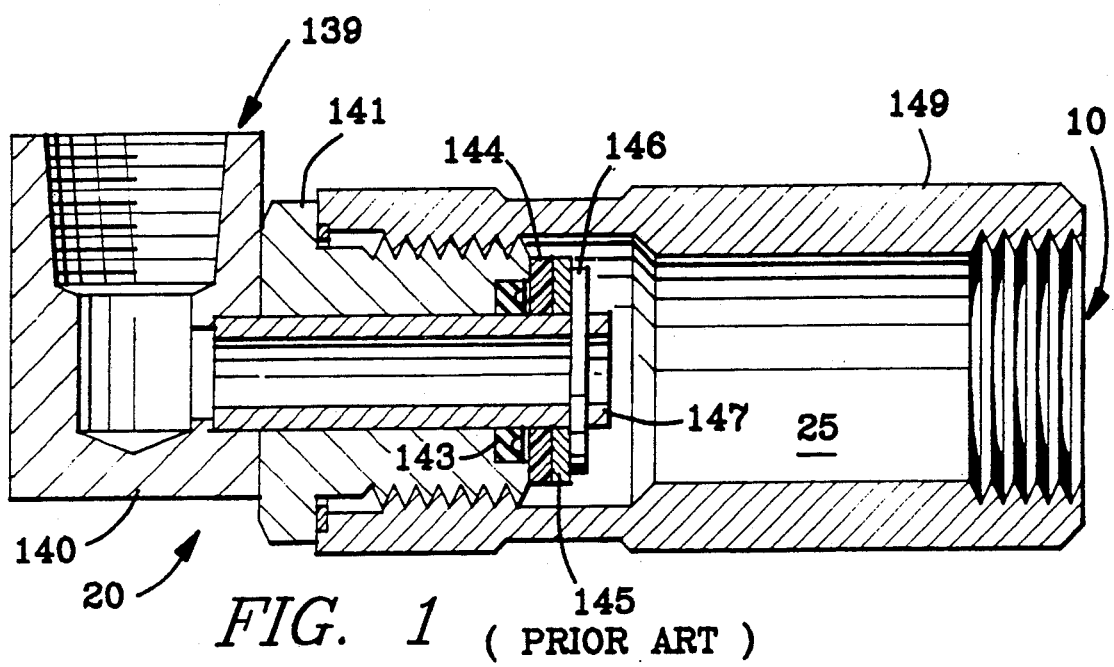
FIG. 1 is an elevation sectional view of a low pressure swivel assembly of the prior art.

FIG. 1 shows a low pressure swivel assembly of the prior art. Swivel body 149 is stationarily attached to the hose reel frame coaxial with the rotatable reel. The swivel body has a threaded inlet end 10, a threaded outlet end 20, and a central axial fluid passageway 25 connecting the two ends. Swivel adapter 139 is made up of swivel stem 140, swivel nut 141, swivel shaft 147, seal ring 143, washers 144 and 145 and retaining pin 146. Swivel nut 141 carries the swivel shaft and is threaded into outlet end 20 of swivel body 149. A copper gasket, not numbered, provides a seal between head of swivel nut 141 and swivel body 149.

Figure 2:
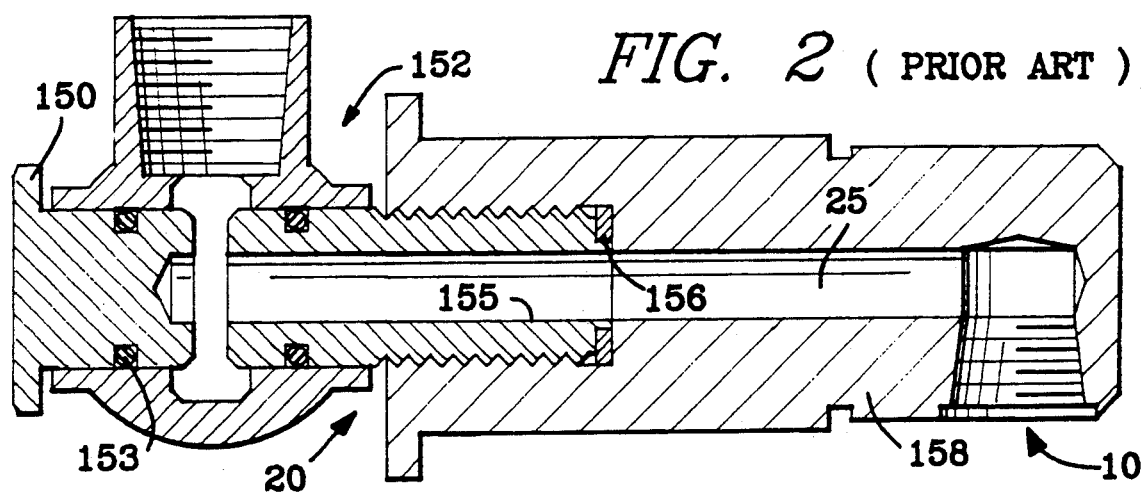
FIG. 2 is an elevation sectional view of a medium pressure swivel assembly of the prior art.

FIG. 2 shows a medium pressure swivel assembly of the prior art. Here, swivel body 158 also has a threaded inlet 10, threaded outlet 20, and central fluid passageway 25. Swivel adapter 159, in this case, is threaded into outlet end 20 of swivel body 158 using the threads on swivel shaft 155. The swivel shaft is sealed within the swivel body by seal ring 156 while the swivel stem 152 is sealed to the swivel shaft by a pair of seal rings 153. The swivel stem 152 is retained on shaft 155 by retaining head 150.

Figure 3:
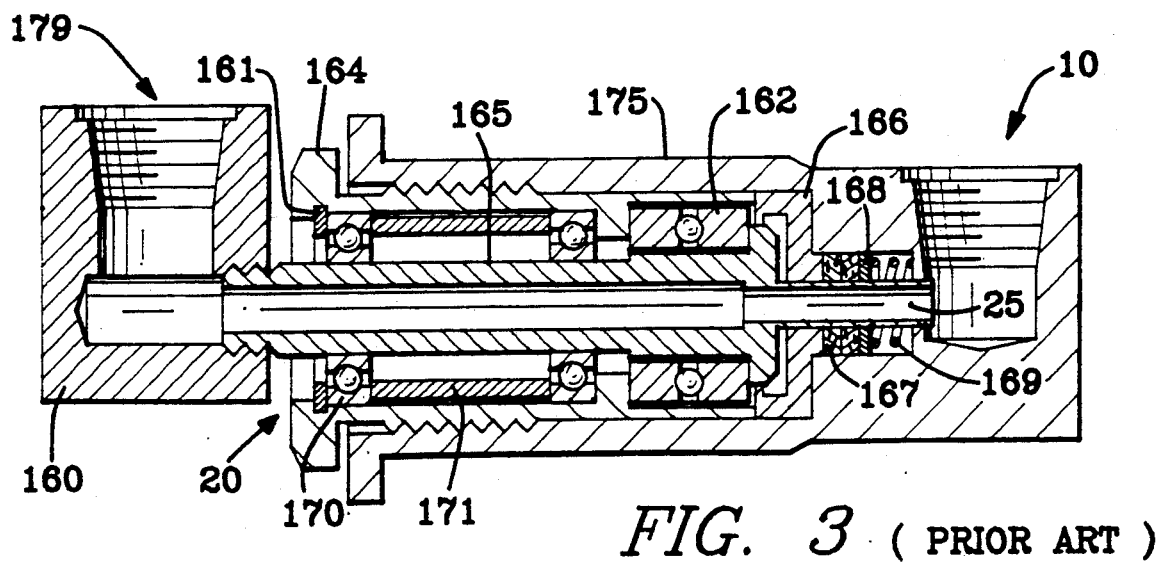
FIG. 3 is an elevation sectional view of a high pressure swivel assembly of the prior art.

FIG. 3 shows a high pressure swivel assembly of the prior art. Here, again, swivel body 175 has inlet and outlet ends 10 and 20, respectively, connected by central fluid passageway 25. Swivel adapter 179 is threaded into outlet 20 of swivel body 175 by means of the threads on swivel shaft housing 164. Thrust bearing 162 is supported between cooperating ledges on the inside of shaft housing 164 and the outside of swivel shaft 165 to carry the axial thrust forces exerted on the assembly. Radial forces are carried by radial bearings 170 mounted between housing 164 and shaft 165 and separated by spacer 171. Retaining ring 161 holds bearings and shaft assembly within the shaft housing. Shaft 165 is threaded into swivel stem 160 while the seal near the inlet end is provided by spacer 166, packing rings 167, washer 168, and spring 169.

Examination of FIGS. 1, 2, and 3 clearly shows the distinctive differences between swivel bodies 149, 158, and 175—differences dictated by the intended service pressures.

Figure 4:
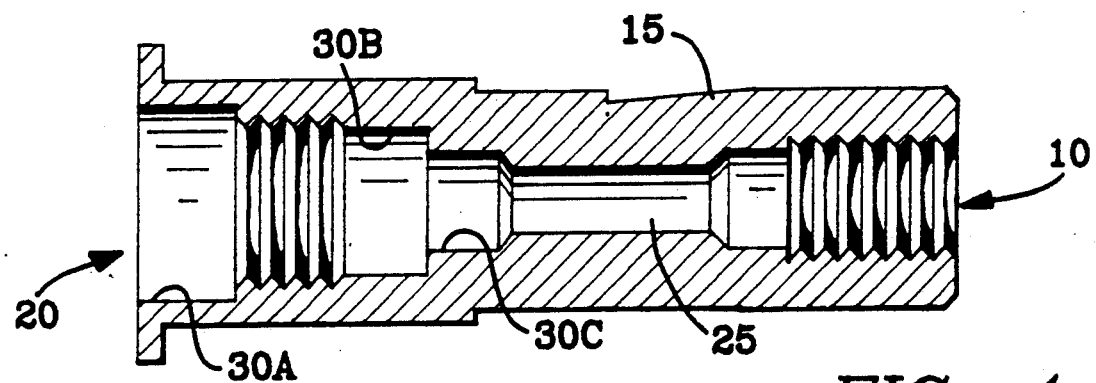
FIG. 4 is a sectional view of the universal swivel body of the present invention.
Figure 5:
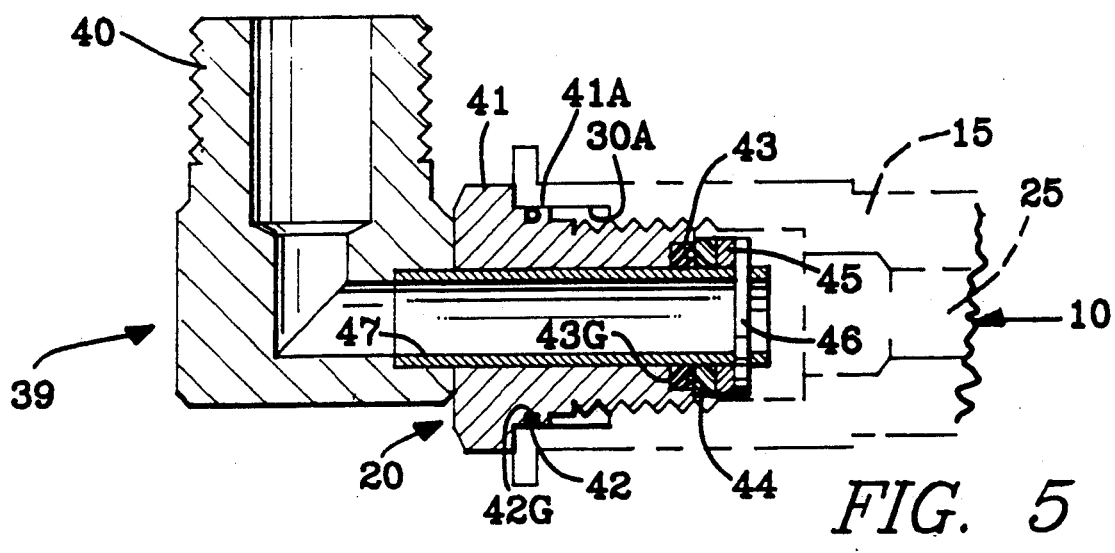
FIG. 5 is a sectional view of the swivel assembly formed when the low pressure swivel adapter is installed in the swivel body of FIG. 4.
Figure 6:
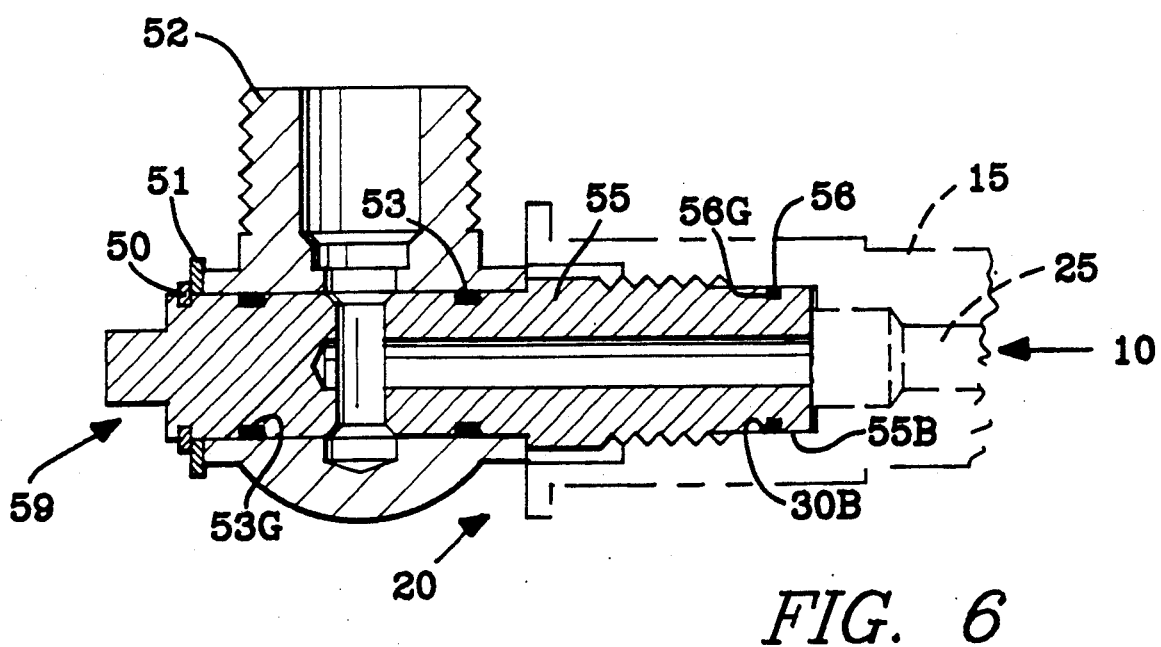
FIG. 6 is a sectional view of the swivel assembly formed when the medium pressure swivel adapter is installed in the swivel body of FIG. 4.
Figure 7:
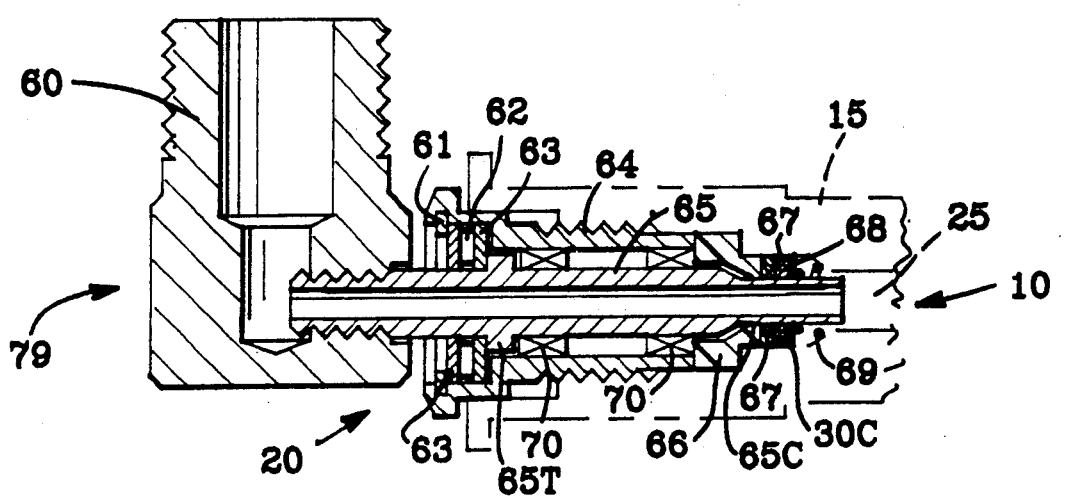
FIG. 7 is a sectional view of the swivel assembly formed when the high pressure swivel adapter is installed in the swivel body of FIG. 4.

FIG. 4 shows the universal swivel body 15 of the present invention. Here, central fluid passageway 25 connects inlet end 10 with outlet end 20 and also provides at least three seal surfaces 30A, 30B, and 30C defined by radial offsets in the wall of the passageway, each of which is so sized that it provides a seal against leakage in cooperation with the sealing elements of the appropriate interchangeable swivel adapters 39A, 59B, and 79C as seen in FIGS. 5, 6, and 7, respectively. Note that the prior art swivel bodies were each designed for use with a specific swivel adapter and, therefore, had sealing surface appropriate only for that swivel adapter. Swivel body wall thicknesses were determined by the service pressure, and the threads for connecting the swivel adapters to the swivel body were commonly different in each case. The present invention, on the other hand, provides a single swivel body which is designed to function with all swivel adapters, regardless of their design service pressure.

This universality is attained by employing a common thread for connecting all interchangeable swivel adapters as well as a specific portion of the axial bore and specific sealing surface within the axial bore for each pressure level contemplated. Thus, by examining FIGS. 4 through 7, it can be seen how the various interchangeable swivel adapters cooperate with the appropriate sealing surfaces 30A, 30B, and 30C, of the swivel body 15 to provide the appropriate working pressure seal.

FIG. 5 shows low pressure swivel adapter 39 which is made up of swivel stem 40, swivel shaft 47, swivel nut 41, seal ring 42, packing ring 43, retaining washers 44 and 45 which capture packing ring 43, and retaining pin 46. Swivel shaft 47 is free to turn in swivel nut 41. A seal between shaft 47 and nut 41 is provided by packing ring 43 captured in an annular groove 43G in swivel nut 41 against the outer surface of shaft 47, while retaining washers 44 and 45 and retaining pin 46 secure swivel shaft 47 against axial movement with respect to swivel nut 41. Seal ring 42, recessed in a cicumferential groove 42G on sealing surface 41A of swivel nut 41, cooperates with seal surface 30A of swivel body 15 to provide the other low pressure seal required.

FIG. 6 shows medium pressure swivel adapter 59 to be made up of swivel shaft 55, seal ring 56 recessed in a circumferential groove 56G on shaft 55, swivel stem 52, retaining washer 51, retaining ring 50, and seal rings 53 recessed in two circumferential grooves 53G on shaft 55 within swivel stem 52. Seal ring 56 cooperates with sealing surface 55B of shaft 55 and seal surface 30B of swivel body 15 to provide the medium pressure seal required between the swivel adapter 59 and swivel body 15. Since swivel shaft 55 is stationary in swivel body 15, swivel stem 52 must be free to rotate on shaft 55. Seal rings 53 provide the necessary seal between the shaft and the rotating stem.

FIG. 7 provides detail of high pressure swivel adapter 79. In this case, swivel stem 60 is threaded onto swivel shaft 65 which rotates within swivel shaft housing 64 on radial bearings 70 and thrust bearing 62. Swivel shaft housing 64 is threaded into swivel body 15. Thrust bearing races 63 and thrust bearing 62 are secured in swivel shaft housing 64 by retaining ring 61 and cooperate with a projecting ring 65T on swivel shaft 65 to prevent axial movement of the swivel shaft with respect to the swivel shaft housing. Radial bearings 70 are secured in swivel shaft housing 64 by a press fit. The high pressure seal is provided by packing rings 67 in cooperation with sealing surface 65C of shaft 65 and with sealing surface 30C of swivel body 15. Spacer 66, together with washer 68 and spring 69, maintain packing rings 67 in their proper axial location and orientation.

Each swivel adapter is sized so that it provides the desired fluid flow at the desired working pressure. Therefore, swivel body 15 is designed so that the smallest diameter of central fluid passageway 25 is sufficient to satisfy the fluid flow requirements of all swivel adapters. Seal surface diameters 30A, 30B, and 30C, in swivel body 15, are optimized for each pressure in order to provide positive sealing with minimum complexity in cooperation with the appropriate sealing surface 41A, 55B, or 65C of the swivel adapter 39, 59, or 79, respectively, for low, medium, or high pressure service, respectively.

Figure 8:
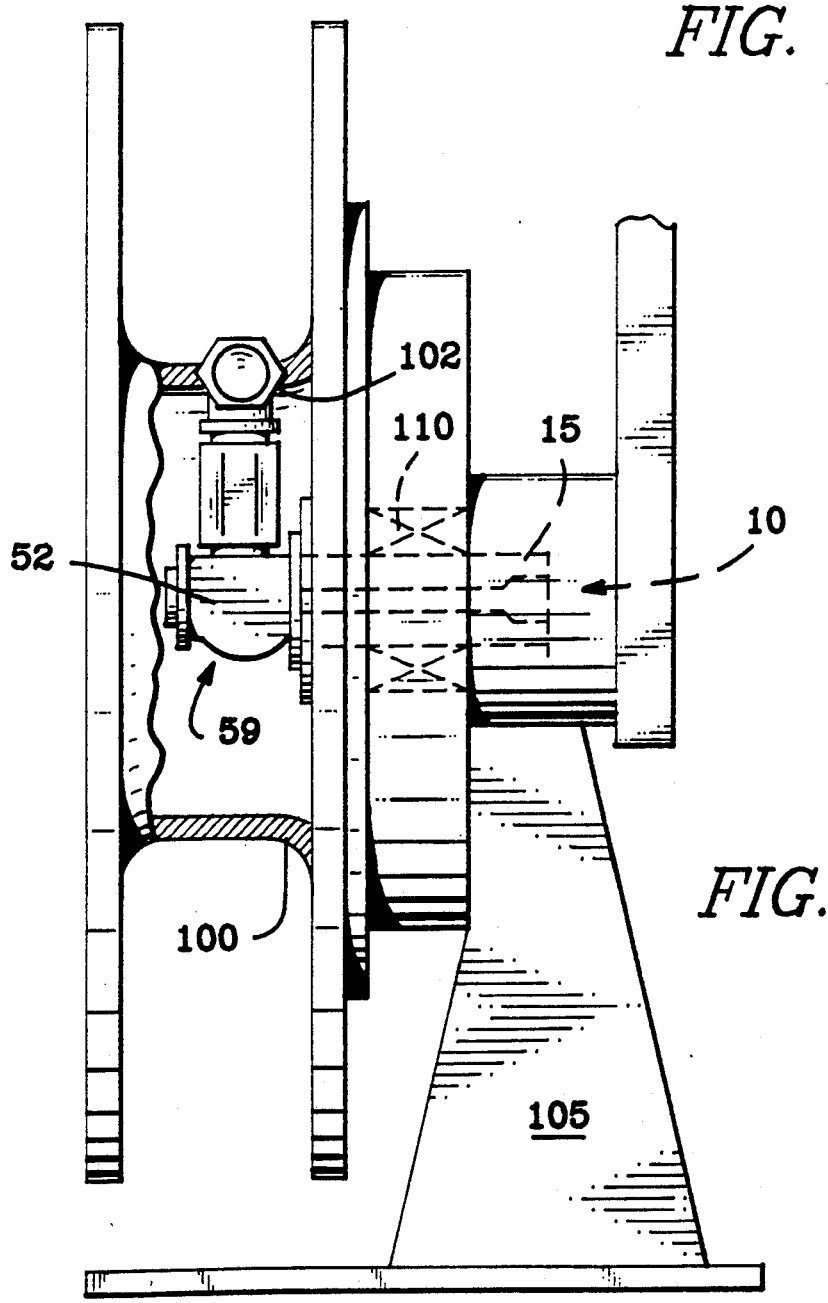
FIG. 8 is a partially sectional view of a hose reel incorporating a medium pressure swivel assembly.

FIG. 8 is a partially cutaway elevation view of a hose reel incorporating a medium pressure swivel assembly which is shown to illustrate one application, of the swivel body of the present invention.

Reel 100 is mounted on bearing 110 which is supported by swivel body 15. The swivel body is rigidly mounted on reel support stand 105. Bearing 110 permits rotation of reel 100 about swivel body 15. Swivel adapter 59 allows hose connector 102 to rotate with reel 100 to extend and reel-in the fluid handling hose for medium pressure applications. Low and high pressure applications would require adapters 39 or 79, respectively, as illustrated in FIGS. 5 and 7.

Using the universal swivel body disclosed herein, it is possible to make all hose reels the same. To change from one working pressure limit to another, only requires installation of the appropriate swivel adapter and attachment of the corresponding pressure rating identity plate. The advantages of such a system are many and are clearly evident.

What is claimed is:

1. A universal swivel body for a fluid handling hose connector, comprising:
   an elongate substantially cylindrical body means having inlet and outlet means for attachment to a nonrotatable fluid supply line and a rotatable fluid service hose, respectively;
   a central axial fluid passageway formed in the body means and connecting said inlet and outlet means; and
   a plurality of sealing surfaces defined by radial offsets in the wall of said axial fluid passageway, each of said sealing surfaces being sized and located to provide, alone or in combination, a fluid tight seal in a specific fluid pressure range in cooperation with a swivel adapter appropriate for service at said pressure range.

2. The universal swivel body of claim 1, wherein the plurality of circumferential sealing surfaces in said axial fluid passageway cooperate with one or more circumferential sealing surfaces on said swivel adapter to provide a fluid-tight seal between the circumferential sealing surfaces of said fluid passageway and said swivel adapter.

3. The universal swivel body of claim 1, wherein one or more compliant sealing rings are interposed between the cooperating circumferential sealing surfaces of said fluid passageway and said swivel adapter.

4. The universal swivel body of claim 3, wherein said one or more compliant sealing rings are held in place by being partially recessed into one or more grooves in one or more circumferential sealing surfaces of said swivel adapter.

5. The universal swivel body of claim 1, wherein said fluid passageway has first, second, and third circumferential sealing surfaces for providing a fluid-tight seal with a cooperating sealing surface on a swivel adapter appropriate for service at high pressure, medium pressure, or low pressure, respectively.

6. A swivel assembly for a fluid handling hose connector, comprising:
an elongate substantially cylindrical universal swivel body means having inlet and outlet means for attachment to a nonrotatable fluid supply line and a rotatable fluid service hose, respectively;
a central axial fluid passageway formed in the swivel body means and connecting said inlet and outlet ends, said fluid passageway having first, second, and third cicumferential sealing surfaces formed by radial offsets in the wall of said fluid passageway;
a swivel adapter selected from among a plurality of interchangeable swivel adapters, each said swivel adapter constructed for service at a different pressure range from each other swivel adapter and attachable to the outlet means of the swivel body; and
means for forming a fluid-tight seal between one or more of said first, second, or third circumferential sealing surfaces of said fluid passageway and one or more cooperating circumferential sealing surfaces of said swivel adapter.

7. The swivel assembly of claim 6, wherein the first, second, and third circumferential sealing surfaces on the wall of said axial fluid passageway cooperate with one or more circumferential sealing surfaces on each swivel adapter and with one or more compliant sealing rings interposed between the circumferential sealing surfaces of said fluid passageway and said swivel adapter to provide a high pressure, medium pressure, or low pressure fluid-tight seal, respectively.

8. The swivel assembly of claim 7, wherein said one or more compliant sealing rings are held in place by being partially recessed into one or more grooves in one or more circumferential sealing surfaces of said swivel adapter.

9. The swivel assembly of claim 7, wherein said first, second, and third circumferential sealing surfaces comprise a small diameter passageway near the inlet means, a medium diameter passageway near the midpoint between inlet means and outlet means, and a large diameter passageway near the outlet means, respectively.

10. A fluid handling hose reel, comprising:
a rotatable cylindrical member upon which a fluid handling service hose is wound;
stationary means for supporting said rotatable cylindrical member;
a non-rotatable universal swivel body fixed to said stationary support means and projecting outwardly along the axis of said rotatable cylindrical member, and having inlet and outlet means for attachment to a nonrotatable fluid supply line and said fluid handling service hose, respectively, and having a central axial fluid passageway connecting said inlet and outlet means;
bearing means for permitting said cylindrical element to rotate relative to said universal swivel body;
a swivel adapter selected from among a plurality of interchangeable swivel adapters, each said swivel adapter constructed for service in a different working pressure range from each other swivel adapter, and attachable to the outlet means of the swivel body, and further having a swivel stem outlet end which is rotatable relative to a swivel stem inlet end which is fixed to the outlet means of said non-rotatable universal swivel body; and
means for attaching the service hose to the swivel stem outlet end of the swivel adapter.

11. The hose reel of claim 10, wherein the universal swivel body has first, second, and third circumferential sealing surfaces on the wall of said central axial fluid passageway which cooperate with one or more circumferential sealing surfaces on said swivel adapter to provide a fluid-tight seal between the circumferential sealing surfaces of said fluid passageway and said swivel adapter for service at high pressure, medium pressure, and low pressure, respectively.

12. The hose reel of claim 10, wherein said fluid passageway has first, second and third circumferential sealing surfaces for providing a fluid-tight seal with a cooperating sealing surface on a swivel adapter appropriate for service at high pressure, medium pressure, or low pressure, respectively.

13. The universal swivel body of claim 9, wherein one or more compliant sealing rings are interposed between the cooperating circumferential sealing surfaces of said fluid passageway and said swivel adapter.

14. The hose reel of claim 13, wherein said one or more compliant sealing rings are held in place by being partially recessed into grooves in one or more of the circumferential sealing surfaces of said swivel adapter.

* * * * *